US011870781B1

(12) United States Patent
Medina et al.

(10) Patent No.: US 11,870,781 B1
(45) Date of Patent: Jan. 9, 2024

(54) ENTERPRISE ACCESS MANAGEMENT SYSTEM FOR EXTERNAL SERVICE PROVIDERS

(71) Applicant: Morgan Stanley Services Group Inc., New York, NY (US)

(72) Inventors: Daniel Medina, Brooklyn, NY (US); Namitha Krishna, Jersey City, NJ (US); Boris Goberman, Fair Lawn, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 306 days.

(21) Appl. No.: 16/801,694

(22) Filed: Feb. 26, 2020

(51) Int. Cl.
*H04L 9/40* (2022.01)
*G06F 16/958* (2019.01)
*G06F 9/54* (2006.01)

(52) U.S. Cl.
CPC .......... *H04L 63/0884* (2013.01); *G06F 9/541* (2013.01); *G06F 16/986* (2019.01); *H04L 63/0807* (2013.01); *H04L 63/0823* (2013.01); *H04L 63/102* (2013.01); *H04L 63/0209* (2013.01)

(58) Field of Classification Search
CPC ............. H04L 63/0884; H04L 63/0807; H04L 63/0823; H04L 63/102; H04L 63/0209; H04L 9/3213; H04L 9/006; H04L 9/3263; G06F 9/541; G06F 16/986; G06F 21/33
See application file for complete search history.

(56) References Cited

U.S. PATENT DOCUMENTS

| 8,739,256 | B2 * | 5/2014 | Foell ...................... G06F 21/41 726/6 |
| 8,745,718 | B1 * | 6/2014 | Dufel ...................... H04L 63/20 726/8 |
| 8,832,814 | B2 | 9/2014 | Coletta et al. |
| 9,276,869 | B2 * | 3/2016 | Dodd ...................... H04L 67/63 |
| 9,531,719 | B1 * | 12/2016 | Sutton ................... H04L 63/083 |
| 10,341,354 | B2 | 7/2019 | Murugesan et al. |
| 10,425,386 | B2 | 9/2019 | Wardell et al. |

(Continued)

OTHER PUBLICATIONS

Ishaq Azhar Mohammed, Identity and Access Management as Security-as-a-Service from Clouds, vol. 5, Issue 4 Nov. 2017, pp. 789-793 (Year: 2017).*

(Continued)

*Primary Examiner* — Luu T Pham
*Assistant Examiner* — Canh Le
(74) *Attorney, Agent, or Firm* — K&L Gates LLP

(57) ABSTRACT

Systems and methods authenticate an end user of an enterprise with an external service provider. The enterprise comprises an identity provider and an entitlements data store that communicate via web services calls. The identity provider makes a determination of whether an end user is authorized to access the external service provider based on: (i) authentication of the end user by the identity provider; and (ii) data from the entitlements data store for the end user with respect to the external service provider. Upon a determination by the identity provider that the end user is authorized to access the external service provider, the identity provider send a SAML token to the end user. The SAML token comprises an XML representation of entitlement information for the end user for the external service provider.

9 Claims, 3 Drawing Sheets

(56) References Cited

U.S. PATENT DOCUMENTS

Figure 1:
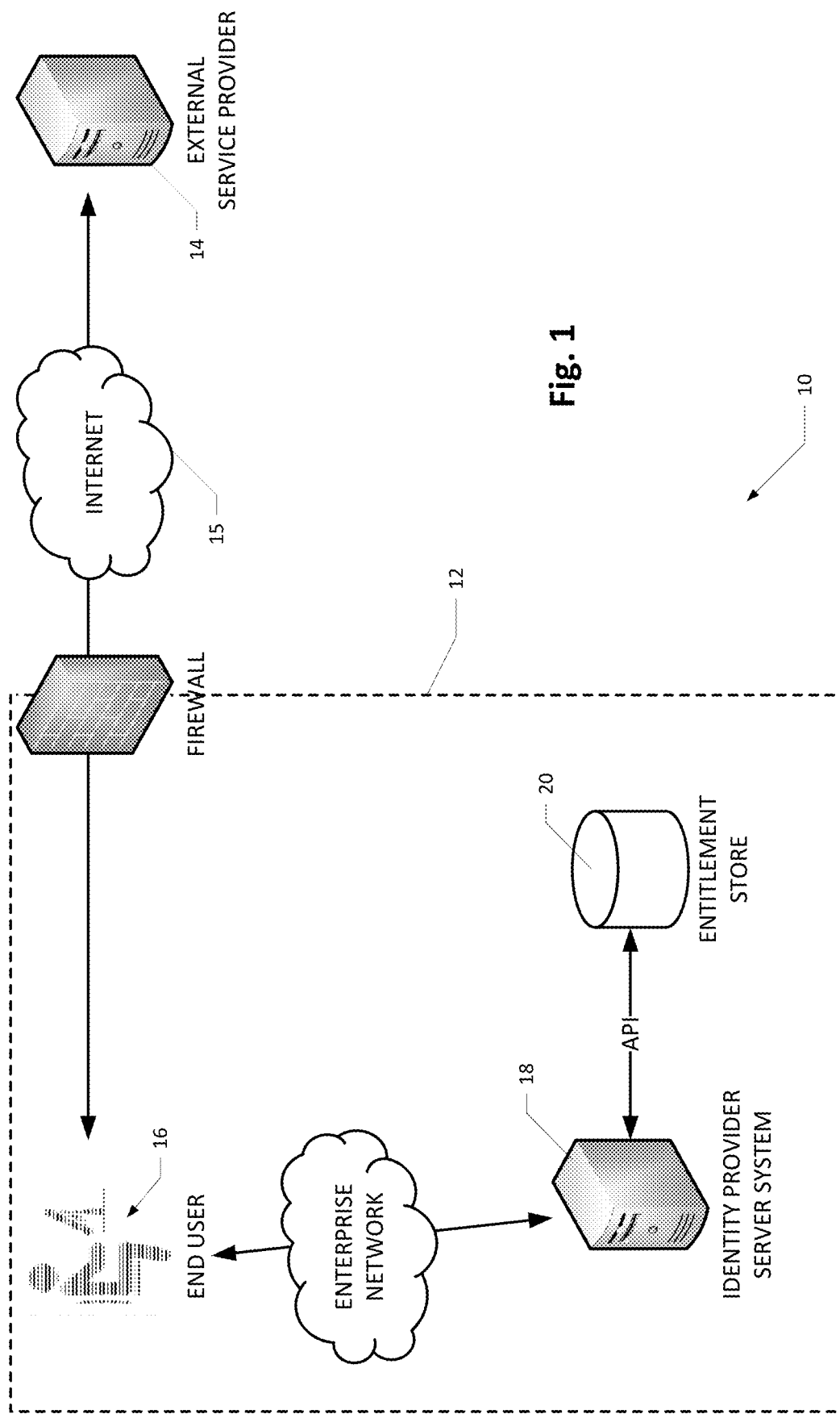

| | | |
|---|---|---|
| 2004/0230831 A1 | 11/2004 | Spelman et al. |
| 2006/0059546 A1* | 3/2006 | Nester ................ H04L 63/0815 726/5 |
| 2008/0028453 A1 | 1/2008 | Nguyen et al. |
| 2011/0107411 A1 | 5/2011 | McClain et al. |
| 2012/0151568 A1 | 6/2012 | Pieczul et al. |
| 2018/0131685 A1* | 5/2018 | Sridhar ................... H04L 67/28 |

OTHER PUBLICATIONS

Audun Josang et al., "Trust Requirements in Identity Management," 2005, pp. 1-10. (Year: 2005).*

* cited by examiner

ENTERPRISE ACCESS MANAGEMENT SYSTEM FOR EXTERNAL SERVICE PROVIDERS

BACKGROUND

Many enterprises rely on federated third party vendor applications, such as applications provided by SaaS (Software as a Service) vendors. A SaaS vendor is a third party that hosts software applications and makes them available to customers over the Internet. It is complicated and difficult for many enterprises, especially large enterprises that have many employees and that partner with many external SaaS vendors, to control the access their enterprises employees to such external SaaS vendors. One reason for this is that the external SaaS vendors typically do not have access to the enterprise's authorization framework.

System for Cross-domain Identity Management (SCIM), which is a standard for automating the exchange of user identity information between identity domains, is one known technique for addressing this issue. However, presently many SaaS vendors do not enable SCIM.

SUMMARY

Embodiments of the present invention address problems with existing identity providers (IdPs) for external SaaS providers with custom add-on software developed for the IdP, such as a Security Assertion Markup Language (SAML) IdP, that can make calls to the web services offered by a centralized entitlement data store to gather the entitlements for an authenticated user. The payload received from the web services is processed by the custom software to conclude if the user is authorized to access the external SaaS provider and if so, collect the different fine grained privileges that the user is entitled to have. A conditional check can be set up on every SAML connection on the IdP such that the data returned by the software is verified to ensure that the user is authorized.

If the user is authorized, then the relevant entitlement information can be included as one of the attributes within the SAML assertion (or "token") and the user can be directed to the external SaaS provider/platform along with the SAML assertion, which can be used by the external SaaS provider to gather the user's entitlement data and accordingly grant/deny access to the SaaS application.

If the user is not authorized, then an error page can be displayed giving the necessary guidelines on the steps to be taken by the end users to overcome the error message. The attempt of the user to access the SaaS application is aborted within the enterprise network if the user is found to be unauthorized. Only authorized users are allowed to continue the operation and accordingly directed to the external SaaS platform.

In one general aspect, therefore, the present invention is directed to a computer system comprising an enterprise network computer system for an enterprise and an external service provider that is in communication with the enterprise network computer system via a computer data network (e.g., the Internet). The external service provider is external to the enterprise network computer system and provides a SaaS application for end users of the enterprise network computer system. The enterprise network computer system comprises, among other things, (i) an identity provider server system for authenticating end users of the enterprise network computer system and (ii) a centralized, "in-network" entitlements data store that stores entitlement data for end users of the enterprise network computer system with respect to the external service provider. The identity provider server system and the entitlements data store are programmed to communicate via web services calls. To that end, the identity provider server system is programmed to make determination of whether an end user is authorized to access the external service provider based on authentication of the end user by the identity provider server system and data from the entitlements data store for the end user with respect to the external service provider. Upon a determination by the identity provider server system that the end user is authorized to access the external service provider, the identity provider server system sends a SAML token to the end user, where the SAML token comprises an XML representation of entitlement information for the end user for the external service provider.

Embodiments of the present invention address many drawbacks in existing identity provider systems for external SaaS providers. As described below, the present invention can provide "just-in-time provisioning" and "just-enough-access" for end users in the enterprise network. Embodiments of the present invention can also provide fine grained access management, audit controls, accountability, and consistent end-user experiences (e.g., consistent enterprise network error messages when authorization to access an external SaaS provider is denied). These and other benefits of the present invention will be apparent from the description that follows.

FIGURES

Figure 2:
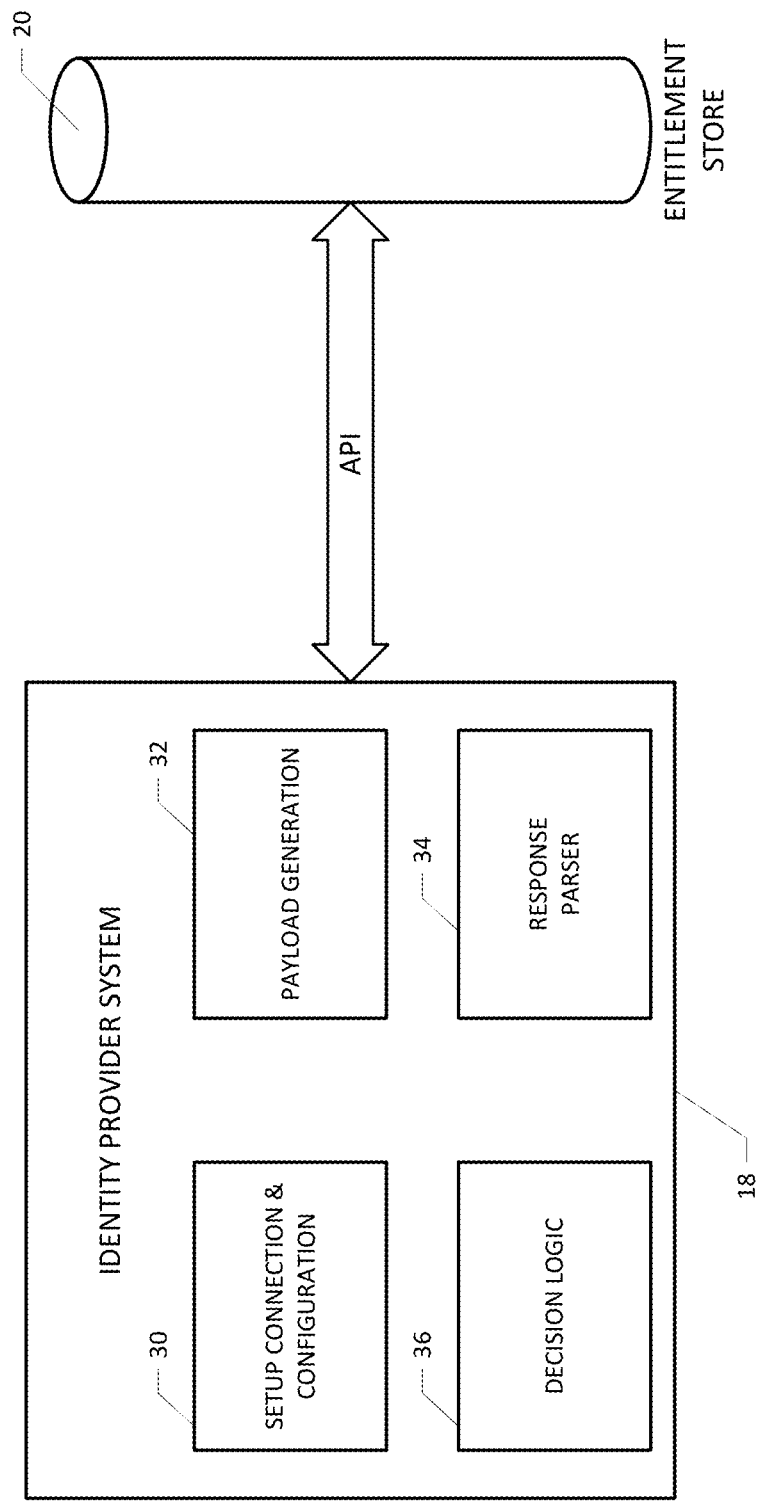
Figure 3:
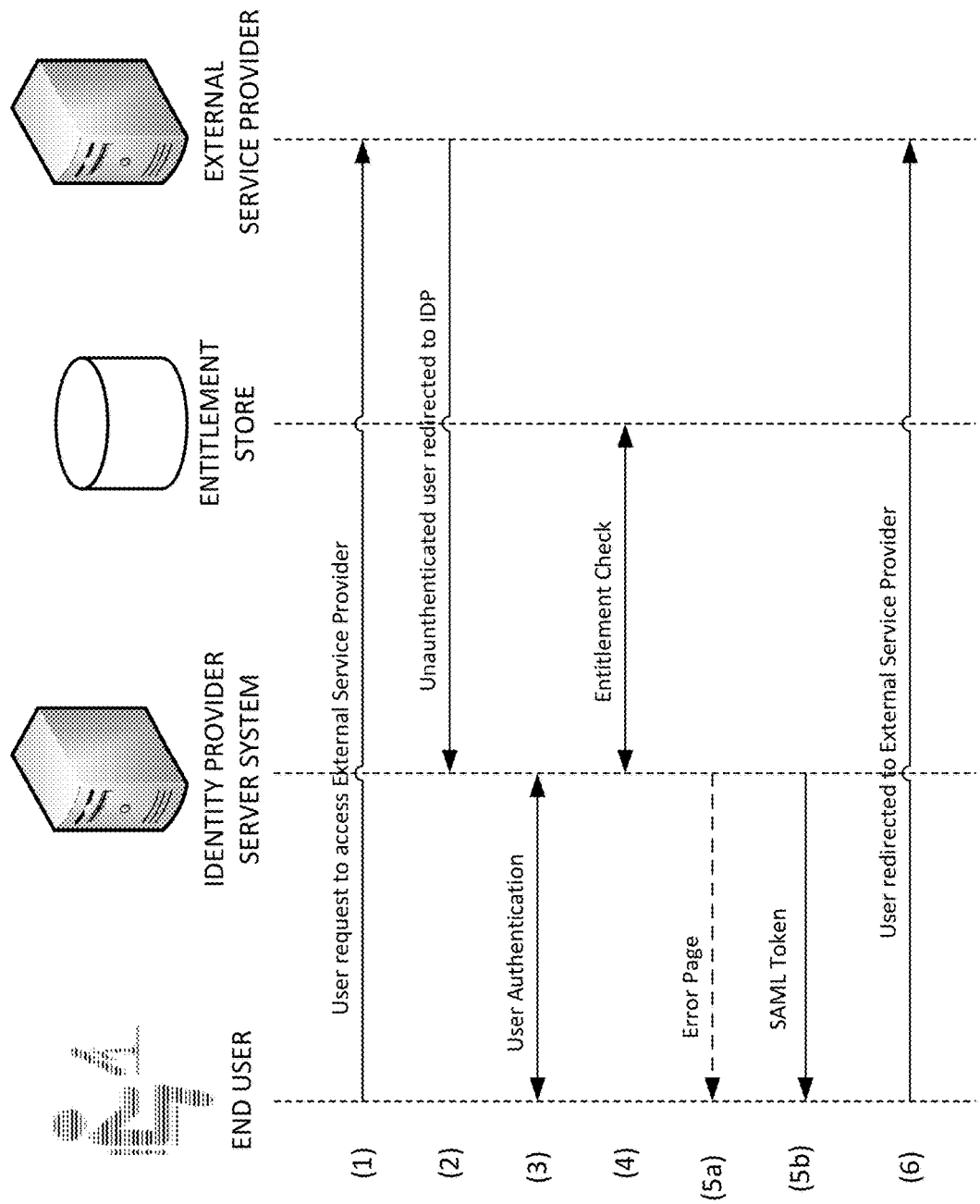

Various embodiments of the present invention are described herein by way of example in connection with the following figures, wherein:

FIG. 1 is a diagram of a computer system according to various embodiments of the present invention;

FIG. 2 is diagram illustrating software modules of the identity provider server system of the computer system of FIG. 1 according to various embodiments of the present invention; and FIG. 3 depicts a process performed by the computer system of FIG. 1 to authenticate an end user of an enterprise to an external service provider, such as an external SaaS vendor application, according to various embodiments of the present invention.

DESCRIPTION

FIG. 1 is a diagram of a computer system 10 according to various embodiments of the present invention. The computer system 10 comprises an enterprise network computer system 12 in communication with an external service provider 14 via the Internet 15 (or some other computer data network). The external service provider 14 may be a federated third party vendor, such as a SaaS (Software as a Service) vendor, that hosts a software application(s) and makes it (them) available to end users 16 of the enterprise over the Internet. Thus, in this context, "external" means that the external service provider 14 is not part of the enterprise computer system 12 and, hence, cannot rely on or leverage the internal user authentication framework of the enterprise to authentic the "in network" end user 16 (i.e., an end user within the enterprise network computer system 12). The enterprise may be a business, an educational organization, a charity, or other type of public or private enterprise or organization.

For simplicity, only one end user 16 and only one external service provider 14 are shown in FIG. 1, although it should be recognized that the enterprise may include many (e.g., thousands) of end users 16 that collectively access many (e.g., hundreds or more) external service providers 14 to assist the end users 16 in the performance of their enterprise-related functions. In fact, because of its scalability, as described herein, the benefits of the present invention tend to more valuable to large enterprises that use many external service providers, although the present invention is also applicable to smaller enterprises and enterprises that use a relatively small number of external service providers.

As shown in FIG. 1, the enterprise computer system 12 comprises an identity provider server system (IdP) 18 (comprising one or more servers) and an entitlement store 20. The IdP 18 authenticates end users 16 and, as described below, in one embodiments, interacts with the entitlement store via a real-time API to determine whether an end user 16 is authorized to access an external service provider 14. The framework can also be used to make more fine-grain entitlement decisions. Examples of fine-grain entitlement decisions include: (a) an end user can have read only permissions on an external SaaS application, but not have permission to modify settings; (b) an end user can have permissions to create and/or modify entities, but not to delete existing entities on a SaaS platform; etc. The information pertaining to those entitlements can be passed in the SAML token (explained further below) for SaaS applications to leverage access management.

In various embodiments, the IdP 18 can make calls—e.g., using an API—to the web services offered by the entitlement store 20 to gather the entitlements for the end user 16 with respect to the external service provider 14 after the end user 16 is authenticated by the IdP 18. To that end, the entitlement store 20 may be implemented as a computer database that stores entitlements of the enterprises end users 16 with respect the external service providers 14 in partnership with the enterprise. That is, authorized managers of the enterprise or other enterprise personnel can access the entitlement store 20 to set the entitlements for the end users 16 with respect to the various external service providers, e.g., which end users are entitled to access which external services providers and under which conditions. The enterprise managers preferably update the entitlements stored in the entitlement store 20 as often as necessary to keep the entitlements of the end users up-to-date.

FIG. 2 is block diagram which shows some software modules of the IdP 18. In particular, FIG. 2 shows software modules of the IdP 18 used to communicate with the entitlement store 20 via API-based web services calls e.g., representational state transfer (REST)-based communications between the IdP 18 and the entitlement store 20. The IdP 18 also provides enterprise network authentication for the end users 16, so the IdP 18 also comprises software for performing authentication (and other functions) that are not shown in FIG. 2 for simplicity.

FIG. 2 shows that the IdP 18 may comprise a setup connection and configuration module 30 that allows the connection between the IdP 18 and the connection store 20 to be setup and configured. The IdP 18 also comprises a payload generation module 32 that generates the message payloads for the web API messages sent to the entitlement store 20. The IdP 18 also comprises a response parser module 34 that parses the responses from the entitlements store 20. And the IdP 18 may also comprise a decision logic module 36 that, in various embodiments, makes the binary decision of whether the end user 16 is entitled to access the external service provider 14.

When the end user 16 requests access to the external service provider 14, the end user 16 is first authenticated (if not already done so) by the IdP 18. The IdP 18 then calls out to the APIs provided by the entitlement store 20. The payload generation module 32 generates the payload sent as part of the API call to the entitlement store 20. The entitlement store 20 then responds with the entitlements for the end user 16 for the external service provider 14. Where appropriate, the response from the entitlements store 20 can include fine-grained entitlements for the end user, e.g. read-only access, read and write access, administrator access, etc. The response parser 34 the parses the message from the entitlements store 20 and, based thereon, the decision logic module 36 can make the binary decision of whether the end user 16 is authorized to access the external service provider 14 or not.

In various embodiments, the IdP 18 can be implemented by one or a network of computer servers. The IDP 18 can be built in any suitable manner, including with custom software or with vendor software products such as PingFederate, Microsoft Active Directory, OpenLDAP, etc. The software modules shown in FIG. 2 can be added, such as part of a software add-on or plug-in, to a conventional IdP (such as a conventional SAML IdP) to provide the IdP functionality described herein. The entitlements store 20 can be implemented with a database(s) that is/are managed by a database management system (DBMS). The database may be a SQL database, although any suitable database implementation may be used.

FIG. 3 is a diagram that shows additional details of the process. At step (1), the end user 16 accesses the external service provider 14 via the Internet to access the SaaS application provided by the external service provider 14. Because the end user 16 is not authenticated by the external service provider 14, the external service provider 14 redirects the access request to the IdP 18 at step (2). Then at step (3), the IdP 18 can authenticate the end user 16. Any suitable authentication technique (e.g., single-factor, two-factor, etc.) can be used to authenticate the end user. Assuming the end user is authenticated at step (3), then at step (4) the IdP 18 consults the entitlement store 20 as described above to determine the end user's entitlements with respect to the external service provider 14. The lines in FIG. 3 for steps (3) and (4) have double-ended arrows because steps (3) and (4) require back-and-forth communications to authenticate the end user at step (3) and to ascertain the end user's entitlements at step (4).

If the end user is not authorized, at step (5a), the IdP 18 can send an error message to the end user 16. This is another advantage with embodiments of the present invention. In many presently existing systems that do not use the IdP and entitlements store of the present invention, the external service provider sends the error message to the end user 16. Because the external service providers used by an enterprise are typically not coordinated, the content of the error messages from the external service providers are not consistent. This can lead to confused and frustrated end users. Also, because the enterprise IT system does not prepare the error messages, the enterprise IT system can often experience difficultly deciphering the error message and rectifying the issue (if it can be rectified) in presently existing systems. In contrast to such presently existing systems, the error messages for unauthorized users with embodiments of the present invention can explain why the end user was not authorized and/or how the end user can rectify the situation. For example, the error message can provide the email address and/or telephone number of the person or department within the firm that could help get the end user authorized.

Also, the error message at step (5*a*) can terminate the process, such that no messages about the authorization attempt are transmitted outside of the enterprise network computer system 12, thereby preventing leakage of enterprise-specific data outside of the enterprise. That is, when an user is not authorized, the IdP 18 need not send a message about the unathorization determination to the external service provider 14 (or any other external system), and instead only the error message to the internal end user is sent.

On the other hand, if at step (4) the IdP 18 determines that the end user 16 is entitled to access the external service provider 14, then at step (5*b*), the IdP 18 sends, in various embodiments, a message to the end user 16 that contains a SAML token (also sometimes referred to as a "SAML Assertion"). SAML (Security Assertion Markup Language) is an open standard for exchanging authentication and authorization data between parties—in this case, the enterprise network computer system 12 and the external service provider 14. The SAML token comprises XML representations of claims. In this context, the claims can relate to rights to a resource, e.g., the condition(s) under which the end user is authorized to access the external service provider 14. For example, where the authentication is based on fine grain conditions, the XML representations in the SAML token generated by the IdP 18 may include relevant entitlement information for the end user with respect to the external service provider (and based on the data in the entitlement store 20).

The SAML token may also be signed by the IdP 18 with a certificate associated with the IdP 18 and may contain a proof key encrypted for the external service provider 14. The end user 16 also receives the proof key and at step (6) the end user 16 presents the SAML token to the external service provider 14, with the message to the external service provider 14 at step (6) signed by the end user 16 with the proof key provided to the end user 16. The IdP's signature over the SAML token informs the external service provider 14 that the IdP 18 issued the SAML token, and the message signature created with the proof key informs the external service provider 14 that the SAML token was issued to the end user 16. Consequently, the external service provider 14 can authenticate the end user 16 and grant access to the end user 16.

Note that step (5*a*) and (5*b*) in FIG. 3 are alternatives. And step (6) follows step (5*b*), not step (5*a*), because if they end user is not authorized to access the external service provider 14, the end user is not redirected to the external service provider with a SAML token.

The above-described identity provider system for external service provider can provide many benefits and advantages compared to existing systems. For example, traditional access management solutions for federated applications require entitlement data to be made available to the external service providers (e.g., SaaS providers) beforehand and so that the external service providers can leverage this information to make access management decisions for users attempting to access the application. With embodiments of the present invention, however, there is no need for out-of-band exchange of entitlement data with the external service providers as all the information required by the external service providers to make authorization decisions are included within the SAML assertion (e.g., SAML) itself.

Also, traditionally entitlement information is propagated to the external SaaS vendors who, in turn, leverage this information to implement the access management solution on their side. With this model, the enterprise has no control over the access management process and cannot implement the auditing and accountability controls around the solution hosted outside the enterprise network. Embodiments of the present invention, however, provide an in-house access management solution that the enterprise has full control over. With this solution, it is possible to implement the necessary controls to ensure auditing and accountability.

Another benefit is that traditionally, entitlement data are sent to the external service provider beforehand and when the user attempts to access the SaaS platform, previously gathered entitlement data is analyzed and a decision is made accordingly to allow/deny access to the user. If the user is not entitled, then an error page is displayed by the vendor. These error pages are hosted on the vendor side and customized as per their convenience. Hence there is no consistency across the error pages displayed by different SaaS vendors to end users of the enterprise, leading to an undesirable end user experience. Also such inconsistency is not helpful when troubleshooting issues. With embodiments of the present invention, however, for an unauthorized user, an error page is displayed by enterprise network such that a meaningful error message can be used. This error page is hosted inside of the enterprise network and the same error page can be used across all the SaaS applications. Unlike the traditional model, this implementation provides a consistent and desirable end user experience that directs the users to the right point of contacts for overcoming the error. Also, "context relevant" error messages could be provided to the end user. For example, the decision logic module 36 of the IdP 18 could map circumstances or conditions (e.g., the "context") for unauthorization decisions to certain specific, context relevant, error messages, so that the end user is provided a more meaningful explanation (e.g., a "context-relevant" explanation) of why authorization was denied. Different contexts can have different context-relevant error messages.

Also, with the traditional approach, it becomes very tedious to cater to fine grained access management use cases for a very large number of SaaS platforms that the enterprise can partnership with. It can be a daunting task for an enterprise to define entitlements at a very fine level for the authorized users for each of the SaaS applications and to ensure smooth propagation of the same information to the vendor side as well. Embodiments of the present invention, however, can scale seamlessly for a large number of applications since managers within the enterprise can control the process of onboarding their end users' entitlement data into the centralized system, which can effortlessly accommodate the fine grained entitlements as well.

Still further, with the traditional approach there is no consistent way to intelligently redirect the unauthorized users to the entitlement provisioning workflow with self service capabilities. In this case, it becomes necessary to create user awareness of such tools. With the present invention, however, SAML connection metadata can be leveraged to direct the users to the workflow that can enable them to provision entitlements using self-service tools.

In various embodiments, therefore, the present invention is directed to computer systems and computer-implemented methods of authenticating an end user of an enterprise network computer system with an external service provider. The system comprises an enterprise network computer system 12 for an enterprise and an external service provider 14 that is in communication with the enterprise network computer system 12 via a computer data network 15. The external service provider is external to the enterprise network computer system and provides a SaaS application for end users of the enterprise network computer system. The enterprise network computer system comprises: an identity provider server system 18 for authenticating end users of the enterprise network computer system; and an entitlements data store 20 that stores entitlement data for end users of the enterprise network computer system with respect to the external service provider. The identity provider server system and the entitlements data store are programmed to communicate via web services calls (e.g., a web services API). The identity provider server system is programmed to make determination of whether an end user is authorized to access the external service provider based on: (i) authentication of the end user by the identity provider server system; and (ii) data from the entitlements data store for the end user with respect to the external service provider. Upon a determination by the identity provider server system that the end user is authorized to access the external service provider, the identity provider server system is programmed to send a SAML token to the end user. The SAML token comprises an XML representation of entitlement information for the end user for the external service provider.

The method may comprise receiving, by the identity provider server system of the enterprise network computer system, from the external service provider, redirection of a request by an end user of the enterprise network computer system to access the external service provider. The method further comprises, upon receiving the redirected request, communicating, by the identity provider server system with the end user via the enterprise network computer system to authenticate the end user to the enterprise network computer system, The method further comprises, upon authenticating the end user to the enterprise network computer system, communicating, by the identity provider server system, via a web service call (e.g., a web services API), with an entitlements data store that is internal to the enterprise network computer system, to determine whether the end user is authorized to access the external service provider. The method also comprises making, by the identity provider server system, a determination of whether the end user is authorized to access the external service provider based on the data from the entitlements data store for the end user with respect to the external service provider. The method also comprise, upon a determination by the identity provider server system that the end user is authorized to access the external service provider, sending, by the identity provider server system, the SAML token to the end user.

In various implementations, the data from the entitlements data store for the end user with respect to the external service provider comprise data about a condition under which the end user is authorized to access the external service provider. In that case, the XML representations in the SAML token may comprise one or more XML representations about the condition under which the end user is authorized to access the external service provider. Also, the SAML token may be signed by the identity provider server system with a certificate associated with the identity provider server system. In addition, the identity provider server system may be configured to, upon a determination that the end user is not authorized to access the external service provider, send a context-relevant error message to the end user. Further, the IdP 18 may be programmed to, upon a determination that the end user is not authorized to access the external service provider and upon sending the context-relevant error message to the end user, terminate the process of determining whether the end user is authorized to access the external service provider.

The IdP 18 may be implemented with one or a number of networked server. Each IdP server may comprise one or more processors (e.g., CPUs or GPUs), primary data storage or memory (i.e., memory that is directly accessible to the CPUs/GPUs, such as RAM, ROM, registers, cache memory), secondary data storage (i.e., data storage that is not directly accessible by the CPUs/GPUs, such as HDDs, flash, SSDs, etc.), nearline and/or off-line storage. The IdP 18 may be programmed to perform the functions described herein with software that is stored in the primary, secondary, nearline and/or off-line data storage and executed by the processor(s) of the IdP 18. The computer software may be implemented using any suitable computer programming language such as .NET, C, C++, JavaScript, Python, Ruby, Lua, and Perl, and using conventional, functional, or object-oriented techniques. Programming languages for computer software and other computer-implemented instructions may be translated into machine language by a compiler or an assembler before execution and/or may be translated directly at run time by an interpreter.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer system comprising:
   an enterprise network computer system for an enterprise; and
   an external service provider comprising one or more servers in communication with the enterprise network computer system via a computer data network, wherein:
   the external service provider is external to the enterprise network computer system;
   the external service provider provides a SaaS application for end users of the enterprise network computer system; and
   the enterprise network computer system comprises:
   an identity provider server system comprising one or more servers configured for authenticating end users of the enterprise network computer system, wherein the end users must be in-network of the enterprise network computer system in order to leverage authentication by the identity provider server system; and
   an entitlements data store that stores entitlement data for end users of the enterprise network computer system with respect to the external service provider, wherein:
   the entitlement data stored by the entitlements data store comprise:

data regarding whether the end users are entitled to access the external service provider; and data regarding, for each end user that is entitled to access the external service provider, one or more actions that the end user is permitted to perform on resources hosted by the external service provider;

the identity provider server system and the entitlements data store are programmed to communicate via web services calls; and the identity provider server system is programmed to, upon a first end user requesting access to the external service provider:

authenticate the first end user in response to an access request from the external service provider;

after authenticating the end user, making a web services call to the entitlements data store; and make a determination of whether the first end user is authorized to access the external service provider based on:

authentication of the first end user by the identity provider server system; and the entitlement data from the entitlements data store for the first end user with respect to the external service provider, wherein the entitlement data for the first end user comprise conditional access parameters of the first end user, and wherein the entitlement data are set by a manager of the enterprise network computer system and such that the conditional access parameters for the first end user are not configurable by the first end user; and upon a determination by the identity provider server system that the first end user is authorized to access the external service provider, send a SAML token to the first end user, wherein the SAML token comprises an XML representation of entitlement information for the first end user for the external service provider, wherein the XML representation of the entitlement information in the SAML token is based on the entitlement data for the first end user stored in the entitlements data store, wherein the XML representation in the SAML token comprises one or more XML representations about the one or more actions that the first end user is permitted to perform on the resources hosted by the external service provider; and upon a determination by the identity provider server system that the first end user is not authorized to access the external service provider, send a message to be displayed for the first end user that first end user is not authorized to access the external service provider, wherein the process of authorizing the first end user is terminated upon display of the message such that enterprise-specific data for the request from the first end user is not sent outside of the enterprise network computer system.

2. The computer system of claim 1, wherein the SAML token is signed by the identity provider server system with a certificate associated with the identity provider server system.

3. The computer system of claim 1, wherein the identity provider server system and the entitlements data store are programmed to communicate via a web service API.

4. The computer system of claim 1, wherein the identity provider server system is further programmed to, upon a determination that the first end user is not authorized to access the external service provider, send an error message to the first end user.

5. The computer system of claim 4, wherein the error message comprises a context-relevant error message.

6. The computer system of claim 5, wherein the identity provider server system is programmed to, upon the determination that the first end user is not authorized to access the external service provider and upon sending the context-relevant error message to the first end user, terminate the process of determining whether the first end user is authorized to access the external service provider.

7. A method of authenticating an end user of an enterprise network computer system with an external service provider, the method comprising:

storing, in an entitlements data store, entitlement data for end users of the enterprise network computer system with respect to the external service provider, wherein:

the external service provider comprises one or more servers in communication with the enterprise network computer system via a computer data network;

the external service provider is external to the enterprise network computer system; and the external service provider provides a SaaS application for end users of the enterprise network computer system;

and wherein the entitlement data stored by the entitlements data store comprise:

data regarding whether the end users are entitled to access the external service provider; and data regarding, for each end user that is entitled to access the external service provider, conditional access parameters that dictate the permitted actions that are allowed to be performed on resources hosted by the external service provider, and wherein the conditional access parameters are set by a manager of the enterprise network computer system such that the conditional access parameters are not configurable by the end users;

receiving, by an identity provider server system of the enterprise network computer system, from the external service provider, redirection of a request by a first end user of the enterprise network computer system to access the external service provider, wherein the identity provider server system comprises one or more server on the enterprise network computer system;

receiving, by the identity provider server system, from the external service provider, redirection of a request by a second end user of the enterprise network computer system to access the external service provider;

upon receiving the redirected request for the first end user, communicating, by the identity provider server system with the end user via the enterprise network computer system to authenticate the first end user to the enterprise network computer system;

upon receiving the redirected request for the second end user, communicating, by the identity provider server system with the end user via the enterprise network computer system to authenticate the second end user to the enterprise network computer system;

upon authenticating the first end user to the enterprise network computer system, communicating, by the identity provider server system, via a first web service call, with the entitlements data store that is internal to the enterprise network computer system, to determine whether the first end user is authorized to access the external service provider;

upon authenticating the second end user to the enterprise network computer system, communicating, by the identity provider server system, via a second web service call, with the entitlements data store, to determine whether the second end user is authorized to access the external service provider;

making, by the identity provider server system, a determination of whether the first end user is authorized to access the external service provider based on the entitlement data from the entitlements data store for the first end user with respect to the external service provider; and making, by the identity provider server system, a determination of whether the second end user is authorized to access the external service provider based on the entitlement data from the entitlements data store for the second end user with respect to the external service provider;

upon a determination by the identity provider server system that the first end user is authorized to access the external service provider, sending, by the identity provider server system, a SAML token to the first end user, wherein the SAML token comprises an XML representation of entitlement information for the first end user for the external service provider, and wherein the XML representation of the entitlement information in the SAML token is based on the entitlement data for the first end user stored in the entitlements data store, wherein the XML representation in the SAML token comprises one or more XML representations about the permitted actions that the first end user is permitted to perform on the resources hosted by the external service provider; and upon a determination by the identity provider server system that the second end user is not authorized to access the external service provider, sending, by the identity provider server system, a message to be displayed for the second end user that second end user is not authorized to access the external service provider, wherein the process of authorizing the second end user is terminated upon display of the message such that enterprise-specific data for the request from the second end user is not sent outside of the enterprise network computer system.

8. The method of claim 7, wherein the SAML token is signed by the identity provider server system with a certificate associated with the identity provider server system.

9. The method of claim 7, wherein the identity provider server system and the entitlements data store communicate via a web service API.

* * * * *